United States Patent [19]

Iwami

[11] Patent Number: 4,682,297

[45] Date of Patent: Jul. 21, 1987

[54] DIGITAL RASTER SCAN DISPLAY SYSTEM

[75] Inventor: Tomoyuki Iwami, Yamato, Japan

[73] Assignee: International Business Machines Corp., Armonk, N.Y.

[21] Appl. No.: 716,008

[22] Filed: Mar. 26, 1985

[30] Foreign Application Priority Data

Apr. 13, 1984 [JP] Japan .................................. 59-73127

[51] Int. Cl.[4] ........................ G09G 1/00; G06F 3/153

[52] U.S. Cl. .................................... 364/521; 340/721; 340/734; 358/183

[58] Field of Search .................. 364/521, 522; 358/22, 358/183; 340/721, 734, 745

[56] References Cited

U.S. PATENT DOCUMENTS

| | | | |
|---|---|---|---|
| 4,398,189 | 8/1983 | Pasierb, Jr. et al. | 340/721 |
| 4,437,092 | 3/1984 | Dean et al. | 340/734 X |
| 4,484,187 | 11/1984 | Brown et al. | 340/721 X |
| 4,484,302 | 11/1984 | Cason et al. | 364/521 X |
| 4,496,976 | 1/1985 | Swanson et al. | 358/183 X |
| 4,528,636 | 7/1985 | Robinson, III | 364/521 |
| 4,554,538 | 11/1985 | Bieneman | 340/721 X |

FOREIGN PATENT DOCUMENTS

| | | |
|---|---|---|
| 54-161839 | 12/1979 | Japan . |
| 57-167079 | 10/1982 | Japan . |
| 57-185085 | 11/1982 | Japan . |

*Primary Examiner*—Felix D. Gruber

[57] ABSTRACT

Digital display data is stored in first and second memories which are accessed together to provide respective streams of picture element data groups for display on a raster scan display device. A comparator compares each data group from a selected one of the streams with a data group representing a particular color. The comparator output is applied as a control input to a multiplexer which also receives the data streams. When no equality is detected, the multiplexer passes the data groups in the compared stream through to the display device. Whenever equality is detected the multiplexer passes the corresponding data group in the non-compared stream through to the display device. The result is that the displayed image corresponding to the compared stream is made transparent at areas corresponding to the compared color, and there areas are filled in with an image corresponding to data from the non-compared stream of data.

9 Claims, 9 Drawing Figures

DIGITAL RASTER SCAN DISPLAY SYSTEM

FIELD OF THE INVENTION

The present invention relates to systems for displaying images on a raster scan display device in response to image-representing digital data.

BACKGROUND ART

In general, raster display systems operate by storing character or image data representing at least one image frame in a memory and displaying text or other images on a cathode ray tube or the like by accessing the memory. Recently, it has been proposed to produce synthesized images by combining different image data to create a frame of data.

An example of such an arrangement is shown in Japanese Published Patent Application No. 185085/82 entitled "Image Display". In this system a prohibition color is specified before display data is written into an image memory from, for example, a floppy disk drive. During the write operation, previous display data is left at locations where the prohibition color is assigned and the new display data is written into the other locations. This allows the composition of a synthesized image comprising an image formed from a plurality of input images. For example, if an image of a bus, as shown in FIG. 6, is stored in an image memory, and the body color, red, and tire color, black, are defined as prohibition colors, then landscape data, as shown in FIG. 5, can be written into the image memory without overwriting the bus image. The combined image can now be read for display on a cathode ray tube display device. With this system, a problem arises when complex image processing, such as the production of animated images, is attempted. If, for example, it is required to move the bus in FIG. 6 across the screen with a fixed background, then the background image data needs to be processed continuously. This requires a complex program and lowers the processing speed.

Other examples of system in which images are built from different portions are shown in Japanese Published Patent Applications No. 161839/79 entitled "Image Generation" and 167079/82 entitled "Overwrite Control System for Graphic CRT".

In the first of these, an image is generated by combining a plurality of basic geometric figures. These figures are defined by parameters, some of which are given a transparency attribute. With such an attribute, the background in the final image can appear through that figure. Thus, movement of that Figure allows corresponding areas of the background to appear without the need for complex programming. However, as the combined image is formed only from basic geometric figures, this arrangement is highly restricted. It cannot, for example, form the images shown in FIGS. 5–8.

In the second of these applications, a technique is disclosed for displaying a plant process which continuously changes. The display data is broken down into a number of elements, each of which is stored in a separate frame memory. In each frame memory, predetermined data is written in locations corresponding to the associated element with the remaining locations being defined as non-data areas. The frame memories are given a priority order and to provide a display, each corresponding location in each frame memory is tested in turn in an order defined by the priorities. In testing, non-data areas are ignored and the element data is applied for display on a CRT. This listing and application process is performed for all the locations in the frame memories in synchronism with the CRT scanning.

This system is convenient when each element is moved and displayed as there is no need to take account of the background. However, it is difficult to display images hidden one by another or to make an image of an element transparent.

DISCLOSURE OF THE INVENTION

The present invention relates to a raster scan display system in which image data representing different images is stored in separate memories. The data from each of the memories is read out simultaneously in streams synchronized with the raster scan. Each picture element data group in one of the screens is compared with a reference data group, representing a particular color. The comparison output is used to select one or the other of the data streams for transmission of the corresponding picture element data group to the display device. Thus, one of the data streams is transparent at those picture elements corresponding to the reference color, so that data from the other group is used to fill in only those picture elements in the display.

DETAILED DESCRIPTION

Figure 1:
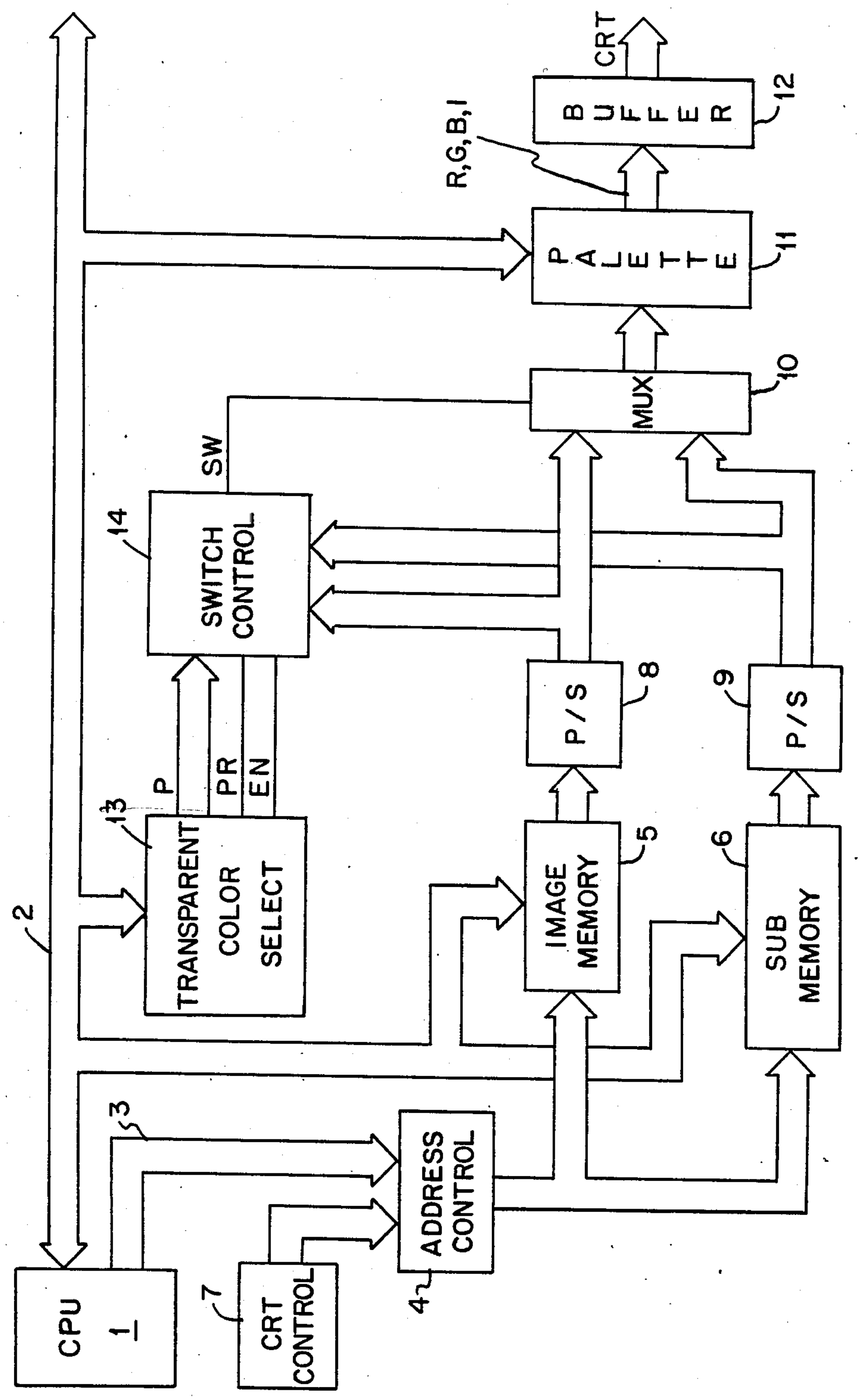
FIG. 1 is a block diagram of a digital display system incorporating a first embodiment of the invention.

FIG. 1 is a block diagram of a system for displaying images on a CRT in response to digital data generated by a CPU 1. CPU 1 may be, for example, a microprocessor type 8088 produced by Intel Corp. Input/output devices (not shown) and a main memory system (not shown) are coupled to a CPU 1 through a data bus 2, an address bus 3, and a control bus (not shown) to effect data processing operations employing these devices. Components 4 through 14 in FIG. 1 are used to generate image data from a CRT (not shown).

An address control circuit 4 receives memory address signals either from CPU 1 or a CRT controller 7. Address signals from circuit 4 simultaneously select locations in an image memory 5 and a sub-memory 6. When addressed from CPU 1, data in these memories is updated by data from the CPU over data bus 2. During such operations either one of the memories can be selected for data transfer, though both are addressed together. When addressed, through the address control circuit 4, by the CRT controller, both memories are read out together to provide sequences of display data.

Image memory 5 is a R.A.M. having a capacity, for example, of 64K bytes. Of these, 32K bytes are used to store image data, with the remainder used, for example, for storage of part of an application program.

In this description, it will be assumed that an all-points-addressable (A.P.A.) data layout is used, though the principle of the invention can be used equally in a character generation system. In the A.P.A. arrangement, the display data is stored in the image memory in successive memory locations in the order in which it is to be passed to the CRT for display. The successive locations are read out in sequence in synchronism with the CRT raster scanning. Thus, each location in the store corresponds to a given location on the CRT screen. In the present embodiment of the invention, each byte in the image memory corresponds to two picture elements (pels) on the screen. Thus, each PEL is represented by 4 bits to provide a 16 color ($=2^4$) display. Each byte read from memory 5 passes through a parallel-to-serial converter P/S 8 which provides two 4 bit pel data groups in response thereto.

Sub-memory 6 is similar to image memory 5 and is arranged to store a different image from that in image memory 5. Both images are derived from data applied to the memories from CPU 1.

Sub-memory 6 has a capacity of 32K bytes and is, therefore, used exclusively to store image data. Though only one sub-memory is shown, it will be appreciated that further such sub-memories, each with its own data image, may be provided. Sub-memory 6 is coupled to a further parallel to serial converter to provide sequential 4 bit pel groups.

The pel data groups from P/S converters 8 and 9 are applied on inputs to a multiplexer 10, which is responsive to signals on a control line SW to apply one or the other to a palette circuit 11 which responds by generating CRT drive signals which are fed to a CRT display unit through a buffer 12. Palette circuit 11 will be described in detail later.

The signals on control line SW, which control the multiplexer, are developed by a switch control circuit 14. This receives, as inputs, transparent color data over bus P, a priority signal over line PR and an enable signal over line EN from transparent color select circuit 13. This data is generated by transparent color select circuit 13 by decoding data received from CPU 1 over data bus 2. The transparent color data comprises 4 bits representing a color to be compared with output data from the P/S converters 8 and 9. The priority signal comprises one bit which, in accordance with its value, controls the comparison operation. The EN signal controls enabling or disabling of the transparent mode, to be described in detail later.

The switch control circuit receives, in addition to the above mentioned data from transparent color select circuit, the 4 bit pel data from the P/S circuits 8 and 9. When the value of the EN bit is '0', the SW output is set to correspond to the value of the PR input bit. When the value of the EN bit is '1', the value of SW output is set in accordance with the result of comparison of the output of either P/S 8 or P/S 9 with the transparent color data from the color select circuit 13. The value of the PR bit now determines which of the P/S 8 and P/S 9 outputs is to be used in each comparison.

This operation may be summarized as follows:

(a) When EN="0", then when PR="1", SW is set to "1" so that the image memory output passes through the multiplexer, and when PR="0", SW is set to "0", so the sub-memory output passes through the multiplexer.

(b) When EN="1", and when PR="1", SW is set to "1" only when inequality is detected between the transparent color input and the image memory output. Thus, the output of the multiplexer is that of the image memory except when the output of the image memory equates to the transparent color, at which time the multiplexer output is the sub-memory output.

(c) When EN="1", and when PR="0", SW is set to "1" only when equality is detected between the transparent color input and the sub-memory output. Thus, the output of the multiplexer is that of the image memory when the output of the sub-memory equals the transparent color or the output of the sub-memory when this differs from the transparent color data.

Operations (b) and (c) represent the transparent mode of operation of the system.

Figure 2:
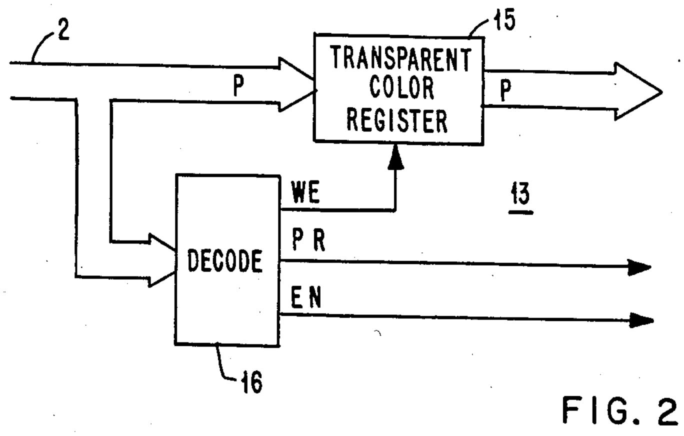
FIG. 2 is a block diagram of the transparent color selection circuit shown in FIG. 1.

FIG. 2 shows the components of the transparent color select circuit 13 of FIG. 1. This circuit comprises a transparent color register 15 and a decoder 16. The circuit is coupled to receive, over bus 2, 4 bits of transparent color data which is stored in register 15, and display mode switching data, which is applied to decoder 16. This data is generated by CPU 1 under program control. The decoder is responsive to the mode switching data to generate the PR and EN signals together with a write enable signal, WE, which is used to control register 15 to write in the transparent color data.

Figure 3:
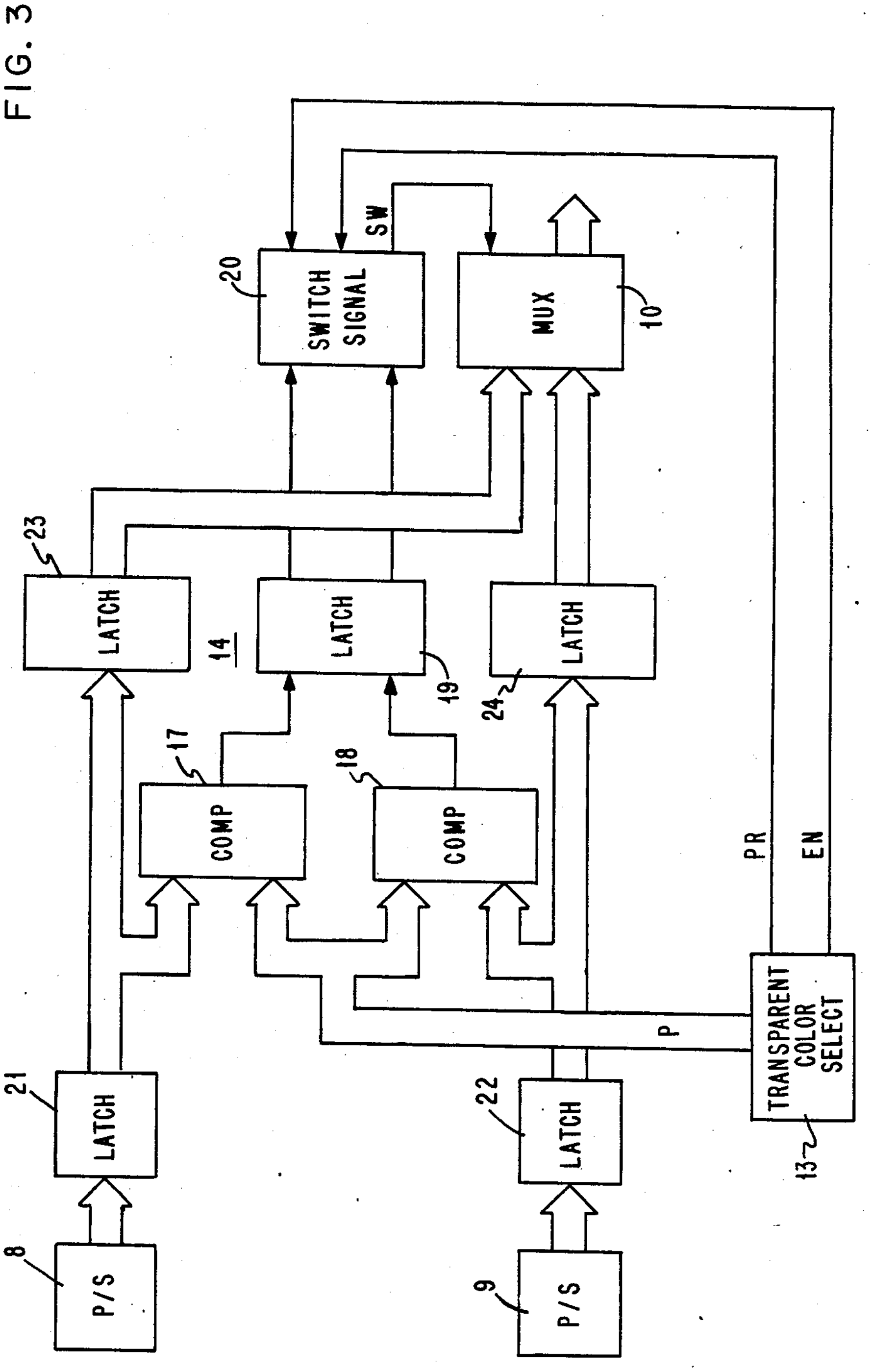
FIG. 3 is a block diagram of the switch control circuit shown in FIG. 1.

FIG. 3 shows details of the switch control circuit 14 of FIG. 1. This circuit comprises two comparators 17 and 18, a latch 19 and a switch signal generator 20. One input of each of comparators receives the transparent color data from the transparent color select circuit 13. P/S circuit 8 provides the other input to comparator 17 through a latch 21, while P/S circuit 9 feeds its output, through a latch 22, to the other input of comparator 18. The respective comparator outputs are applied through a latch 14 to a switch signal circuit 20 which provides the SW signal to control multiplexer 10. When the switch circuit 20 receives the PR and EN signals and the comparator outputs from latch 14, it generates the SW signal for multiplexer 10 as described herein with reference to FIG. 1. Latches 21 through 24, which control circuit timing, were not shown in FIG. 1 for simplicity.

Figure 4:
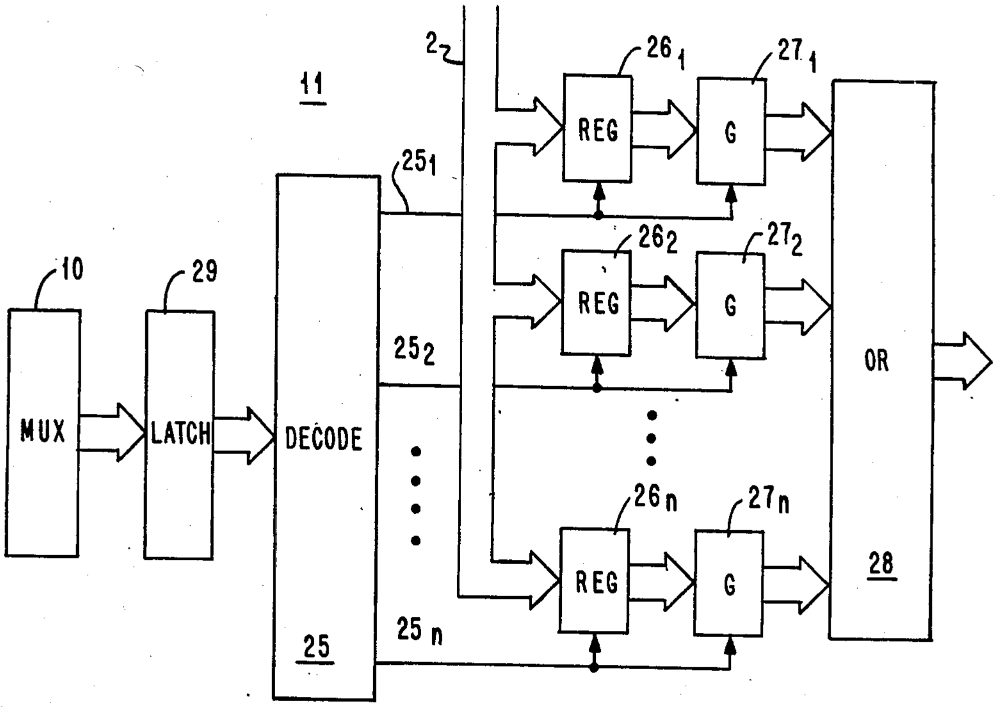
FIG. 4 is a block diagram showing details of the palette circuit of FIG. 1.

FIG. 4 shows details of the palette circuit 11 of FIG. 1. This circuit comprises a decoder 25, palette registers $26_1$–$26_n$, gate circuits $27_1$–$27_n$ and an OR circuit 28. Pel data from multiplexer 10 is latched by a latch 29 and then fed to decoder 25. The decoder has n output lines $25_1$–$25_n$, of which one is activated for each pel data group input. In the present example, with 4 bit pel data, the decoder is a 1-out-of 16 type. Each decoder output line is coupled to the write signal input of a corresponding one of a set of registers $26_1$–$26_n$ and the gate input of the corresponding one of a set of gates $27_1$–$27_n$. Consequently, for each pel data group input, the content of a selected one of registers $26_1$–$26_n$ is passed to, and through OR circuit 28 to the CRT.

The palette registers are supplied with data, which defines the actual pel data fed to the CRT, from CPU 1 through bus 2. If, during such updating of the palette data, the gates $27_1$–$27_n$ are enabled, there is the possibility that a poor or confusing display could be produced. Accordingly, the updating is performed during the blanking time of the CRT. The palette registers $26_1$–$26_n$ may each contain 5 as move bits. If the number is five, then 32 ($=2^5$) colors can be set, of which 16 can be displayed at one time.

FIGS. 5 through 8 show displayed images which illustrate the operation of the invention. This operation is normally executed by an application program.

Figure 5:
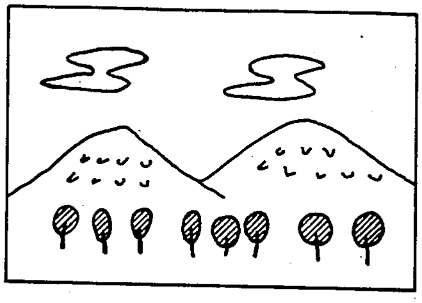
FIGS. 5–8 show display images produced by the FIG. 1 system.
Figure 6:
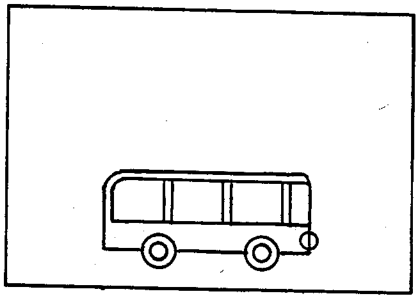
Figure 7:
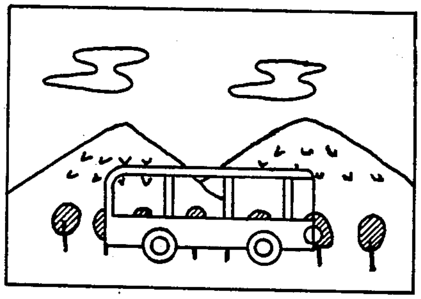
Figure 8:
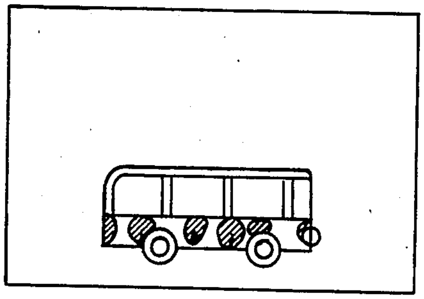

Firstly, the image data for the bus shown in FIG. 6 is written into the FIG. 1 image memory. This data is, for example, transmitted from an external data storage device such as a floppy disk drive. In FIG. 8, it will be assumed that the color of the background and the windows of the bus is blue, while the body and tires of the bus are red and black, respectively. Next, the data corresponding to the landscape of FIG. 5 is written into sub-memory 6 of FIG. 1. Thereafter the transparent color P is set into the transparent color select circuit 13 and the switch control circuit 14 of FIG. 1. In the present example, this color is assumed to be blue. The image memory 5 and sub-memory 6 are accessed simultaneously under control of the address control unit 4 to provide pel data stream corresponding to the images of FIGS. 5 and 6. These streams are applied to switch control circuit 14. When EN="1" and PR="1", each pel group from the image memory corresponding to the blue background and window portions of FIG. 6 coincides with the blue transparent color input. This causes, for each of these groups, a SW output of "0". Accordingly, the pel data groups from submemory 6 are fed through multiplexer 10 to the palette register system. Since the pel groups from image memory 5 representing the other portions of the image of FIG. 6, that is, the bus and tires, do not correspond with the blue transparent color input, the SW output for each of these groups is "1", so that these pel groups are fed through multiplexer 10 to palette register 11. Thus, the image displayed on the CRT becomes that shown in FIG. 7.

If the transparent data is changed to red, then the image shown in FIG. 8 is displayed. It is believed that this requires no further explanation.

If the PR signal is made "0", then the FIG. 6 becomes the background and the FIG. 5 landscape becomes the foreground image. If the green for the trees is then specified as the transparent color, the display becomes such that the bus is viewed through the trees.

If the EN signal is set to "0", only the image with higher priority, as defined by the value of the PR signal, is displayed. In this case, the system is not operating in the transparent mode.

Figure 9:
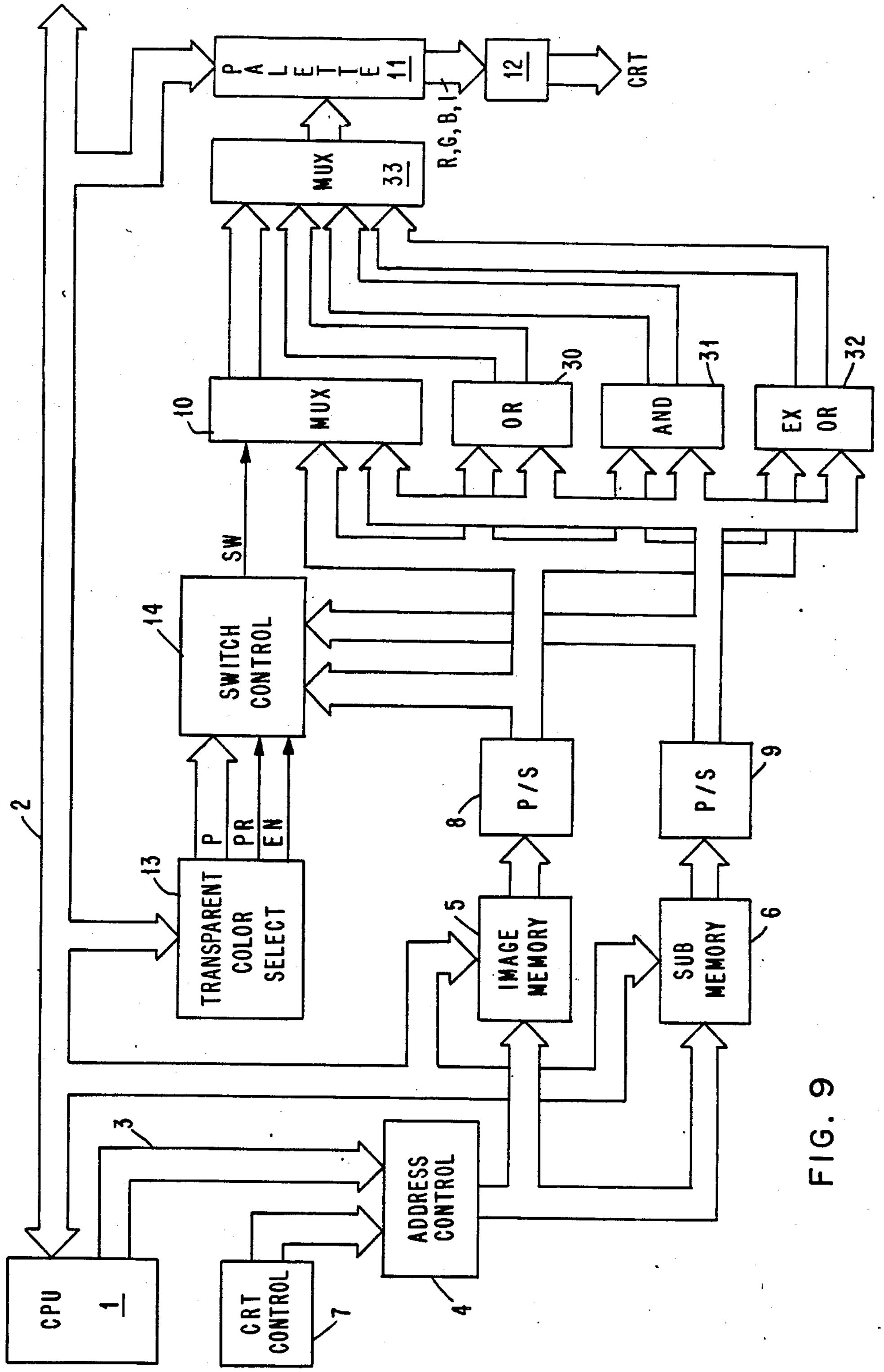
FIG. 9 is a block diagram of a digital display system incorporating a second embodiment of the invention.

FIG. 9 is a block diagram of a second embodiment of the invention. In this Figure, like numerals represent like components of FIG. 1, and these components operate in the same manner as in the FIG. 1 system. In addition, the image memory and sub-memory outputs are applied, through P/S 8 and P/S 9, respectively, to an OR circuit 30, an AND circuit 31 and an OR circuit 32. The outputs of these logic circuits are all applied to a multiplexer 33 in addition to the output of multiplexer 10. Selection of any one of these outputs by multiplexer 33 allows further variations of the displayed images.

Various modifications may be made to the above embodiments of the invention. For example, a character generator system of a bit map/character generator combined system may be used. In addition, the transparent areas may be specified by data representing a plurality of transparent colors by storing each of these colors for comparison with pel data from the selected memory.

What has been described is an arrangement in which predetermined areas in an image are specified as transparent areas by selecting a transparent color which corresponds to the color of those areas. The invention may be used to combine images to form an image synthesized from the input images. The invention may be used to provide movement to images, and to window images to display various texts or graphs in a single displayed image.

While the invention has been described herein with reference to particular embodiments, it will be understood the various other changes in form and detail may be made without departing from the spirit and scope of the invention.

What is claimed is:

1. A raster scan display system comprising:

first and second memory means for storing display data;

access means for simultaneously reading data from the first and second memories to provide respective streams of picture element data groups for display on a raster scan display device;

switch control means coupled to the memories to receive said streams of data and to a data processing device to receive therefrom a data group representing a selected picture element value and having an output carrying signals indicative of equality or inequality between each picture element group in a selected one of said streams and said selected picture element value data; and first multiplexer means coupled to receive said streams and having a control input responsive to said output to select one or the other picture element group in each pair of corresponding groups in the respective streams in accordance with the corresponding indicative signal for passage through the multiplexer towards the raster scan display device.

2. A raster scan display system according to claim 1 in which said switch control means is responsive to the sensing of inequality or equality between a picture element data group in the selected stream and the data group from the data processing device to provide outputs, respectively, to cause the multiplexer to pass the picture element data group in the selected stream or the corresponding data group in the other stream.

3. A raster scan display system according to claim 1 including a priority line coupled from said data processing device to the switch control means and energizable to select the data stream from one or the other of the memories for comparison with the selected picture element value data group.

4. A raster scan display system according to claim 2 including a priority line coupled from said data processing device to the switch control means and energizable to select the data stream from one or the other of the memories for comparison with the selected picture element value data group.

5. A raster scan display system according to claim 3 including an enable line coupled from said data processing device to the switch control means, said switch control means being responsive to a first signal on the enable line to perform said comparison or to a second signal on the enable line to disable the comparison to provide an output signal to the multiplexer to select one only of the streams of data for passage through the multiplexer.

6. A raster scan display system according to claim 5 in which said switch control means includes means responsive to the signals on the priority and enable lines and operative in response to a said second signal on the enable line to provide output signals to the multiplexer to select the streams of data from the first or the second memory for passage through the multiplexer in accordance with signals on the priority line.

7. A raster scan display system according to claim 4 including a priority line coupled from said data processing device to the switch control means and energizable to select the data stream from one or the other of the memories for comparison with the selected picture element value data group.

8. A raster scan display system according to claim 7 in which said switch control means includes means responsive to the signals on the priority and enable lines and operative in response to a said second signal on the enable line to provide output signals to the multiplexer to select the streams of data from the first or the second memory for passage through the multiplexer in accordance with signals on the priority line.

9. A raster scan display system according to claim 1 further comprising at least one logic circuit coupled to the first and second memories to receive said stream of data and arranged to perform bit-by-bit logical functions on each picture element group in the streams, and second multiplexer means coupled to receive the ouput of the first multiplexer means and the output of the, or each, logic circuit, said second multiplexer means being controllable to select one of its input data streams for passage to the raster scan display device.

* * * * *